(12) United States Patent
Kumashio

(10) Patent No.: US 9,942,287 B2
(45) Date of Patent: Apr. 10, 2018

(54) INFORMATION PROCESSING SYSTEM, TERMINAL DEVICE, AND METHOD

(71) Applicant: Hiroya Kumashio, Chiba (JP)

(72) Inventor: Hiroya Kumashio, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 247 days.

(21) Appl. No.: 14/525,665

(22) Filed: Oct. 28, 2014

(65) Prior Publication Data

US 2015/0149532 A1    May 28, 2015

(30) Foreign Application Priority Data

Nov. 27, 2013 (JP) .................. 2013-245296

(51) Int. Cl.
*H04L 29/06* (2006.01)
*H04L 12/18* (2006.01)
*H04L 29/08* (2006.01)

(52) U.S. Cl.
CPC ........ *H04L 65/403* (2013.01); *H04L 12/1822* (2013.01); *H04L 67/325* (2013.01)

(58) Field of Classification Search
CPC . H04L 65/403; H04L 12/1822; H04L 67/325; H04M 3/567
USPC ......................................................... 709/203
See application file for complete search history.

(56) References Cited

U.S. PATENT DOCUMENTS 6,067,565 A * 5/2000 Horvitz ............. G06F 17/30861
707/E17.107
7,225,227 B2   5/2007 Omura et al.
2002/0103864 A1* 8/2002 Rodman ............. H04L 12/1818
709/204
2002/0103867 A1   8/2002 Schilter
2002/0194434 A1  12/2002 Kurasugi
2005/0052338 A1*  3/2005 Suzuki ..................... H04N 7/15
345/1.1
2006/0195507 A1*  8/2006 Baek ................. G06F 17/30905
709/203
2008/0005233 A1*  1/2008 Cai .................. H04L 29/06027
709/204
2011/0169858 A1   7/2011 Sakaguchi
(Continued)

FOREIGN PATENT DOCUMENTS

JP    2002-373109 A   12/2002
JP    2004-072428      4/2004
(Continued)

OTHER PUBLICATIONS

Japanese Office Action for corresponding Japanese Application No. 2013-245296 dated Sep. 26, 2017.

*Primary Examiner* — Douglas Blair
(74) *Attorney, Agent, or Firm* — Harness, Dickey & Pierce, P.L.C.

(57) ABSTRACT

An information processing system includes one or more terminal devices; and an information processing apparatus connected to the one or more terminal devices via a network. Further, the terminal device includes an output control unit controlling timing to acquire a second data which are to be output subsequent to a first data which are output in response to an instruction from the information processing apparatus, and a storage unit storing the second data acquired by the output control unit.

19 Claims, 13 Drawing Sheets

(56) References Cited

U.S. PATENT DOCUMENTS

| | | | | |
|---|---|---|---|---|
| 2011/0175929 A1* | 7/2011 | Tanaka | ............... | G06Q 10/101 345/629 |
| 2012/0151336 A1* | 6/2012 | Scherpa | ............. | H04L 12/1822 715/273 |
| 2014/0344360 A1* | 11/2014 | Bank | ................... | H04L 65/403 709/204 |
| 2015/0046533 A1* | 2/2015 | Talloen | ............... | H04M 3/567 709/204 |

FOREIGN PATENT DOCUMENTS

| | | |
|---|---|---|
| JP | 2005-250787 A | 9/2005 |
| JP | 4320444 | 8/2009 |
| JP | 2012-108744 A | 6/2012 |
| JP | 5153795 | 2/2013 |

\* cited by examiner

FIG.4

| CONFERENCE ID | CONFERENCE NAME | START DATE AND TIME | CONFERENCE STATE | ORGANIZATION PASSWORD | PARTICIPATION PASSWORD | DOCUMENT ID |
|---|---|---|---|---|---|---|
| M01 | BOARD MEETING | 2013/10/10 13:00 | NOW TAKING PLACE | PASS_XXXX | PASS_YYYY | D01 |
| M02 | A PRODUCT SALES APPROVAL MEETING | 2013/10/10 14:00 | BEFORE STARTED | AAAA | N/A | D02 |
| M03 | B PRODUCT SALES PERSON MONTHLY MEETING | 2013/10/12 09:30 | BEFORE STARTED | N/A | N/A | D03 |
| M04 | T DIVISION POLICY PRESENTATION MEETING | 2013/10/15 15:00 | BEFORE STARTED | TTTT | N/A | D04 |
| .. | .. | .. | .. | .. | .. | .. |

FIG.5

| DOCUMENT ID | DOCUMENT NAME | STORAGE LOCATION |
|---|---|---|
| D01 | 2013 BUDGET SUMMARY | file://10.101.0.2/doc/2013 budget summary.doc |
| D02 | SALES ORGANIZATION | file://10.101.0.2/doc/a product sales organization.doc |
| D03 | SALES STATE IN SEPTEMBER 2013 | file://10.101.0.2/doc/sales state201309.xls |
| D04 | T DIVISION POLICY IN SECOND HALF OF 2013 | file://10.101.10.13/doc/policy presentation 2013 second half.ppt |
| . . | . . | . . |

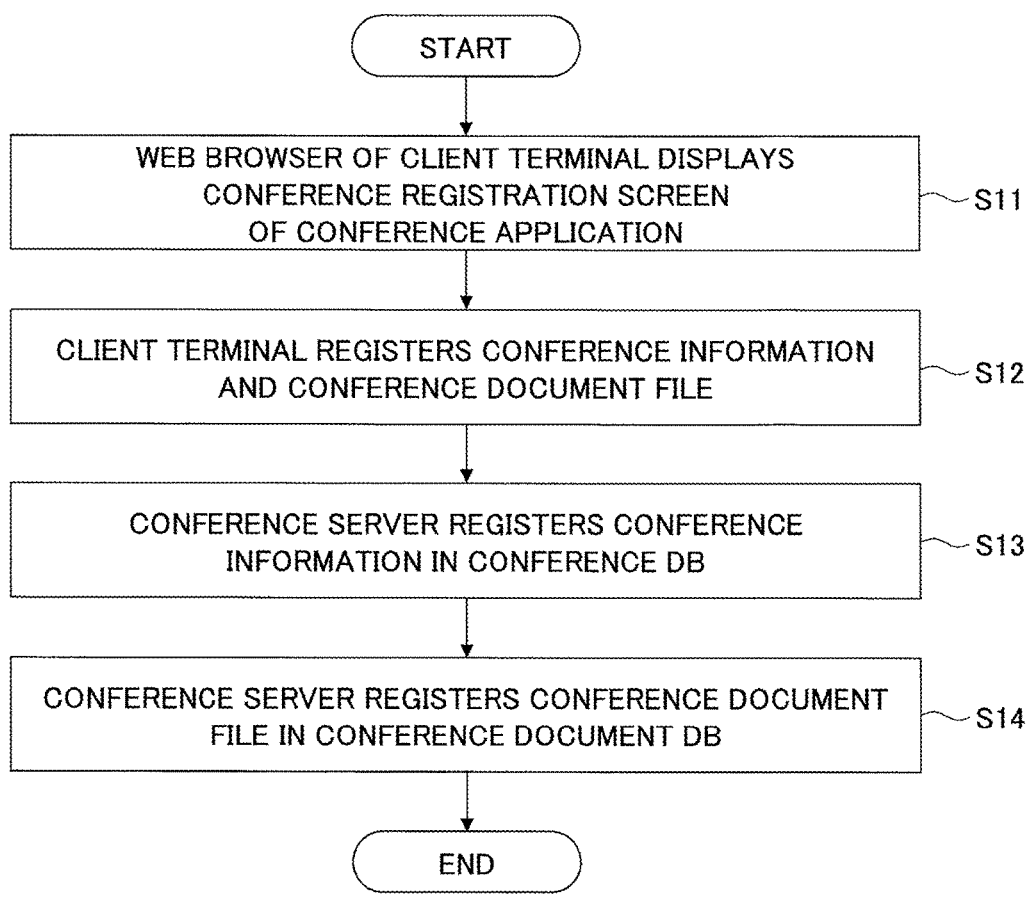

FIG. 7

Conference Center

ORGANIZATION
·PARTICIPATION
☐ CONFERENCE TODAY

CONFERENCE MANAGEMENT
% CONFERENCE LIST
+ REGISTER NEW CONFERENCE

OTHERS
⊙ HELP
ⓘ ABOUT APPLICATION

CONFERENCE MANAGEMENT/REGISTER NEW CONFERENCE

○ INPUT CONFERENCE REGISTRATION INFORMATION

INFORMATION

| CONFERENCE NAME | SPECIFICATION REVIEW MEETING |
| START DATE AND TIME | 2013/09/17  12:00 |
| REMARKS | PLEASE CONTACT IF INCONVENIENT |
| PARTICIPATION PASSWORD | ●●●  RE-ENTER ●●● |
| ORGANIZATION KEY | ●●●  RE-ENTER ●●● |
| OK TO DISPLAY CONFERENCE NAME IN CONFERENCE LIST ? | ⦿ YES  ○ NO |
| OK TO PREVENT CHANGE OF PRESENTER ? | ● NO  ○ YES |

DOCUMENT

| DOCUMENT NAME | REMARKS | ORIGINAL FILE |
|---|---|---|
| ○ v1.4_b5 size beginner's guide.pdf | | AVAILABLE |
| [ADD] [CHANGE] | [DELETE] | |

[STORE]

FIG.8

| Conference Center | ORGANIZATION・PARTICIPATION/CONFERENCE TODAY |
|---|---|
| ORGANIZATION ・PARTICIPATION<br>□ CONFERENCE TODAY<br>CONFERENCE MANAGEMENT<br>% CONFERENCE LIST<br>+ REGISTER NEW CONFERENCE<br>OTHERS<br>? HELP<br>ⓘ ABOUT APPLICATION | ○ DISPLAY ORGANIZED AND ATTENDABLE CONFERENCE<br><br>SEARCH CONDITIONS<br>CONFERENCE ID・CONFERENCE NAME [　　]<br>CONFERENCE STATE  ● ALL  ○ NOW TAKING PLACE  ○ NOT STARTED<br><br>SEARCH RESULT |

| | CONFERENCE ID | CONFERENCE NAME | START DATE AND TIME | CONFERENCE STATE |
|---|---|---|---|---|
| ○ | 7238-131015 | choh | 2013/10/15 16:15 | NOW TAKING PLACE |
| ○ | 8147-131015 | iimuro | 2013/10/15 19:45 | NOT STARTED |
| ○ | 6656-131016 | TEST MEETING 1 | 2013/10/16 16:30 | NOT STARTED |
| ○ | 7778-131017 | oni | 2013/10/17 10:15 | NOT STARTED |
| ○ | 4883-131017 | ORGANIZATION KEY | 2013/10/17 10:30 | NOT STARTED |
| ○ | 6244-131017 | PREVENT OF CHANGE | 2013/10/17 10:45 | NOT STARTED |
| ○ | 8115-131017 | PARTICIPATION PASSWORD | 2013/10/17 10:45 | NOT STARTED |
| ○ | 4489-131017 | SUPPORT EDUCATION TEST | 2013/10/17 12:00 | NOT STARTED |

ORGANIZATION ・PARTICIPATION    ◂ PREVIOUS 10 DATA    1-8/8    NEXT 10 DATA ▸

FIG.13

| | TIME INTERVAL OF FORESEEING PROCESS |
|---|---|
| DOWNLOAD OF PAGE INFORMATION RIGHT AFTER GENERATION OF OR PARTICIPATION IN CONFERENCE | 30s |
| PAGE INFORMATION IS NOT HIT OTHER THAN CASE OF RIGHT AFTER GENERATION OF OR PARTICIPATION IN CONFERENCE | 10s |
| PAGE INFORMATION IS HIT OTHER THAN CASE OF RIGHT AFTER GENERATION OF OR PARTICIPATION IN CONFERENCE | 0s |

INFORMATION PROCESSING SYSTEM, TERMINAL DEVICE, AND METHOD

CROSS-REFERENCE TO RELATED APPLICATIONS

The present application is based on and claims the benefit of priority under 35 U.S.C § 119 of Japanese Patent Application No. 2013-245296 filed Nov. 27, 2013, the entire contents of which are hereby incorporated herein by reference.

BACKGROUND OF THE INVENTION

1. Field of the Invention

The present invention generally relates to an information processing system, a terminal device, and a method.

2. Description of the Related Art

Regarding a paperless conference system, there is a known method in which, for example, a server generates a set of sliced data corresponding to pages of the document, so that the client terminal downloads and displays the sliced data corresponding to the page of the document. Here, in order to reduce a conference time and a time necessary for turning pages, there is a known method using a cache device disposed between the server and client terminal and a read-ahead device causing the cache device to foresee (read, acquire) data (in advance) (see, for example, Japanese Patent No. 4320444).

SUMMARY OF THE INVENTION

According to an aspect of the present invention, an information processing system includes one or more terminal devices; and an information processing apparatus connected to the one or more terminal devices via a network. Further, the terminal device includes an output control unit controlling timing to acquire a second data which are to be output subsequent to a first data which are output in response to an instruction from the information processing apparatus, and a storage unit storing the second data acquired by the output control unit.

BRIEF DESCRIPTION OF THE DRAWINGS

Other objects, features, and advantages of the present invention will become more apparent from the following description when read in conjunction with the accompanying drawings, in which:

FIG. 4 illustrates an example configuration of a conference information table;

FIG. 5 illustrates an example configuration of a document information table;

FIG. 6 is a flowchart of an example conference registration process;

FIG. 7 is a conceptual drawing of an example conference registration screen of a conference application;

FIG. 8 is a conceptual drawing of an example conference list screen;

FIG. 13 illustrates an example table specifying a wait time.

DETAILED DESCRIPTION OF THE PREFERRED EMBODIMENTS

Next, details of an embodiment of the present invention are described. In this embodiment, a conference system is described as an information processing system according to an embodiment of the present invention. However, it should be noted that the present invention is not limited to the conference system. For example, the present invention may be applied to a system that displays information.

System Configuration

Figure 1:
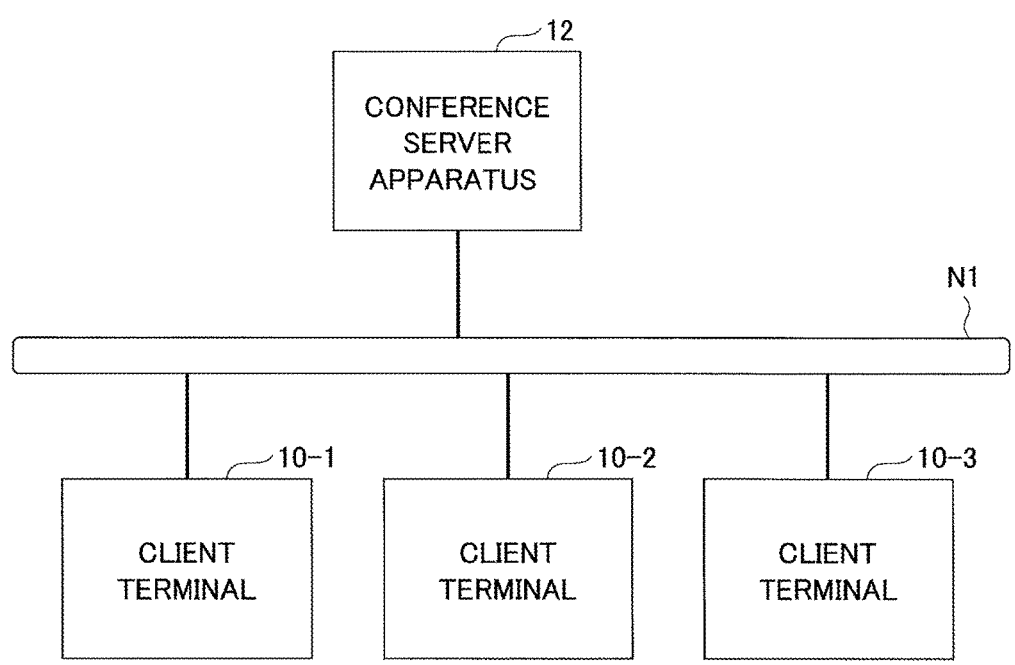
FIG. 1 illustrates an example configuration of a conference system according to an embodiment.

FIG. 1 illustrates an example configuration of a conference system according to this embodiment. In the example of FIG. 1, a conference system 1 includes one or more client terminals 10, (in the example of FIG. 1, client terminals 10-1 through 10-3) and a conference server apparatus 12, which are connected via a (communication) network N1. Here, the network N1 refers to a network such as, for example, a Local Area Network (LAN) or the Internet so that the client terminals 10 and the conference server apparatus 12 are connected to each other wirelessly or with a wire.

The client terminals 10 herein refer to, for example, terminal devices that can be operated by the respective users. The client terminal 10 may be, for example, a desktop personal computer (PC), a laptop PC, a tablet terminal, a smartphone, a cellular phone, etc. The client terminal 10 accesses the conference server apparatus 12, receives (downloads), for example, a conference document image from the conference server apparatus 12, and synchronously or asynchronously displays the conference document image. Here, the client terminal 10 may be, for example, an image forming apparatus such as a printer, a multifunction peripheral or the like, a projection device such as a projector or the like, or an interactive electronic whiteboard.

The conference server apparatus 12 is realized by one or more computers. The conference server apparatus 12 may be, for example, a Work Station (WS), a PC, etc. The conference server apparatus 12 performs information processing on the information related to the conference. The conference server apparatus 12 manages the conference (e.g., to generate, edit, delete, and search for a conference and to communicate with the client terminal(s) 10 during the conference).

The conference server apparatus 12 stores, for example, conference information which is registered by the client terminal(s) 10 or the like, the conference document image, etc. Further, for example, the conference server apparatus 12 transmits the conference document image to the client terminal 10 that requests to acquire the conference document.

The conference server apparatus 12 accumulates, for example, a HyperText Markup Language (HTML) document, a Cascading Style Sheets (CSS) file, a JavaScript (registered trademark) file, an image file, etc. The JavaScript file is an example of a file which is described in a script language (simplified program language). Here, it is assumed that the conference server apparatus 12 functions as the conference server. However, the hardware configuration of the conference server apparatus 12 is not limited to a specific configuration. In this regard, the conference server apparatus 12 may include a terminal, etc., or may be configured based on a so-called "Cloud service".

The conference system 1 of FIG. 1 is a so-called "paperless conference system" in which, for example, a conference document in a form of electronic data is displayed on a screen of the client terminal(s) 10. In the conference system 1, for example, the conference server apparatus 12 stores a set of page data (i.e., conference document images) (hereinafter may be simplified as "page data") which refers to a set of images corresponding to the pages of the conference document, and transmits page information to be displayed in the conference to the client terminal(s) 10.

The client terminal 10 acquires the page data corresponding to the page information from the conference server apparatus 12 and displays the page data. Then, the client terminal 10 controls a timing to foresee (read) the next page data (in advance) and caches the foreseen next page data. By doing this, for example, even when it is necessary to turn a page of the conference document in the conference, it becomes possible for the client terminal 10 to display the page (of the conference document) corresponding to the turning of the page in a shorter time period. Further, for example, it becomes possible to perform a page display synchronization process among the plural client terminals 10. Details are described below.

Hardware Configuration

Figure 2:
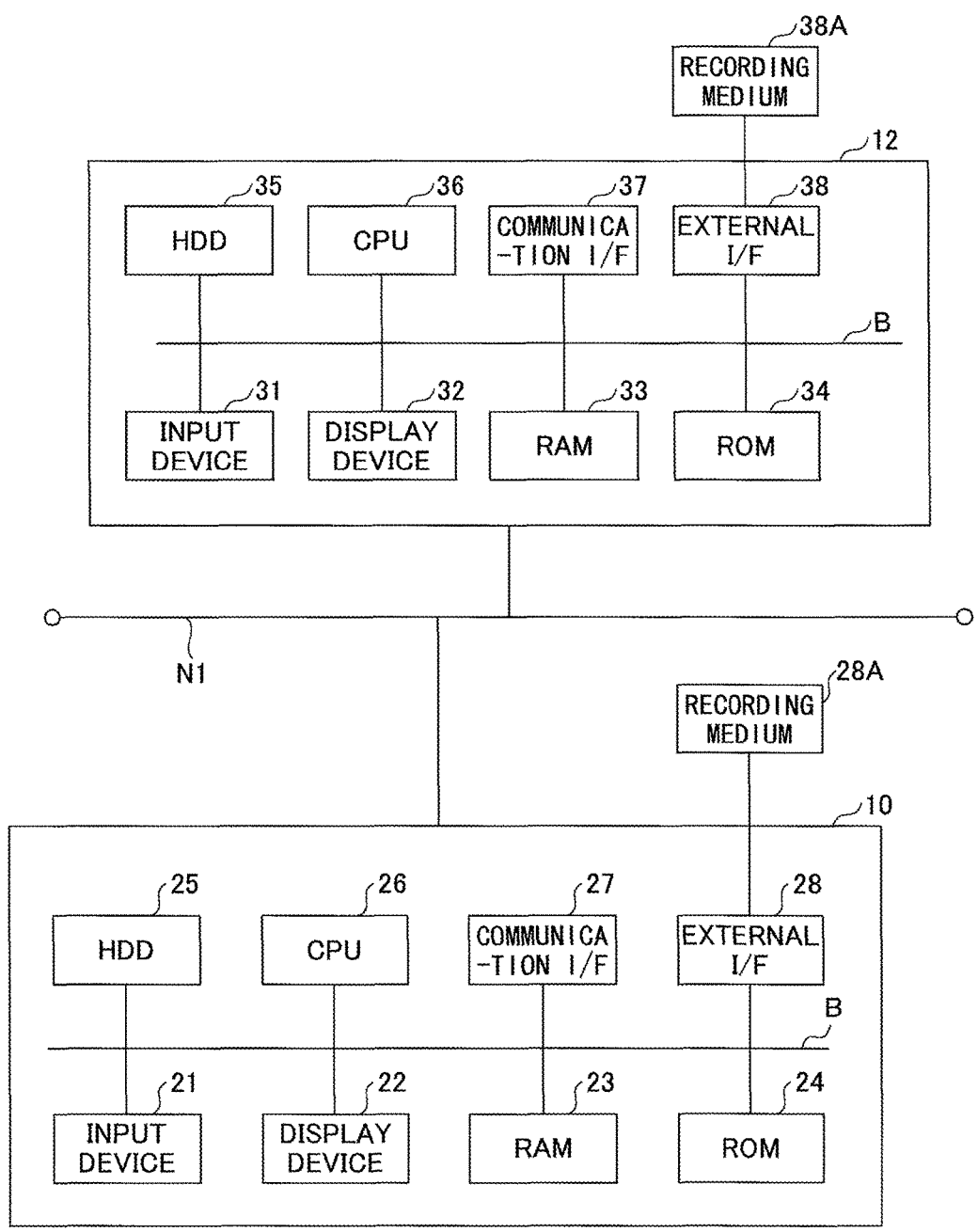
FIG. 2 illustrates an example hardware configuration of a computer included in the conference system.

The client terminal(s) 10 and the conference server apparatus 12 may have, for example, a hardware configuration as illustrated in FIG. 2.

FIG. 2 illustrates an example hardware configuration of the computers included in the conference system 1 according to an embodiment. As illustrated in FIG. 2, the client terminal 10 includes an input device 21, a display device 22, a Random Access Memory (RAM) 23, a Read-Only Memory (ROM) 24, a Hard Disk Drive (HDD) 25, a Central Processing Unit (CPU) 26, a communication interface (I/F) 27, and an external I/F 28, which are connected to each other via a bus B.

The input device 21 includes, for example, a keyboard, a mouse, a touch panel, etc., and is used to input various operation signals into the client terminal 10. The display device 22 includes a display or the like to display a processing result by the client terminal 10.

The RAM 23 is a volatile semiconductor memory (storage device) to temporarily store a program and data. The ROM 24 is a non-volatile semiconductor memory (storage device) that can store a program and data even when the power to it is turned off. In the ROM 24, programs and data are stored such as, for example, the Basic Input/Output System (BIOS) that is executed when the client terminal 10 is started up, OS settings, and network settings.

The HDD 25 is a non-volatile storage device storing programs and data. Such programs and data include an Operating System (OS) which is a basic software for controlling the entire client terminal 10 and application software programs that provide various functions running on the OS.

The CPU 26 is an arithmetic device that realizes the entire control and functions of the client terminal 10 by loading the programs and data from a storage device such as the ROM 24, the HDD 25 and the like to the RAM 23 and executing the processes.

The communication I/F 27 is provided to connect the client terminal 10 to the network N1. By having this, it becomes possible for the client terminal 10 to perform data communication with the conference server apparatus 12 via the communication I/F 27.

The external I/F 28 is an interface to an external device. Such an external device includes a recording medium 28A or the like. By having this, it becomes possible for the client terminal 10 to read and/or write programs and data with the recording medium 28A or the like via the external I/F 28.

Such a recording medium 28A includes a flexible disk, a Compact Disk (CD), a Digital Versatile Disk (DVD), an SD Memory card, a Universal Serial Bus (USB) memory, etc.

The client terminal 10 can realize (execute) various processes described below by having such a hardware configuration described above and executing the program. It should be noted that, for example, it is possible to add a hardware element such as a microphone, a speaker, a camera, etc., to the hardware configuration of the client terminal 10 in FIG. 2.

On the other hand, as illustrated in FIG. 2, the conference server apparatus 12 includes an input device 31, a display device 32, a RAM 33, a ROM 34, an HDD 35, a CPU 36, a communication I/F 37, and an external I/F 38, which are connected to each other via a bus B. Here, the input device 31 and the display device 32 may be included in (attached to) the conference server apparatus 12 when necessary.

The input device 31 includes, for example, a keyboard, a mouse, a touch panel, etc., and is used to input various operation signals into the conference server apparatus 12. The display device 32 includes a display or the like to display a processing result by the conference server apparatus 12.

The RAM 33 is a volatile semiconductor memory (storage device) to temporarily store a program and data. The ROM 34 is a non-volatile semiconductor memory (storage device) that can hold a program and data stored therein even when the power to it is turned off. In the ROM 34, programs and data are stored such as, for example, the Basic Input/Output System (BIOS) that is executed when the conference server apparatus 12 is started up, OS settings, and network settings.

The HDD 35 is a non-volatile storage device storing programs and data. Such programs and data include an Operating System (OS) which is basic software for controlling the entire conference server apparatus 12 and application software programs that provide various functions running on the OS.

The CPU 36 is an arithmetic device that realizes the entire control and functions of the conference server apparatus 12 by loading the programs and data from a storage device such as the ROM 34, the HDD 35 and the like to the RAM 33 and executing the processes.

The communication I/F 37 is provided to connect the conference server apparatus 12 to the network N1. By having this, it becomes possible for the conference server apparatus 12 to perform data communication with client terminal 10 via the communication I/F 37.

The external I/F 38 is an interface to an external device. Such an external device includes a recording medium 38A or the like. By having this, it becomes possible for the conference server apparatus 12 to read and/or write programs and data with the recording medium 38A or the like via the external I/F 38. Such a recording medium 38A includes a flexible disk, a CD, a DVD, an SD Memory card, a USB memory, etc.

The conference server apparatus 12 can realize (execute) various processes described below by having such a hardware configuration described above and executing the program.

Software Configuration

Figure 3:
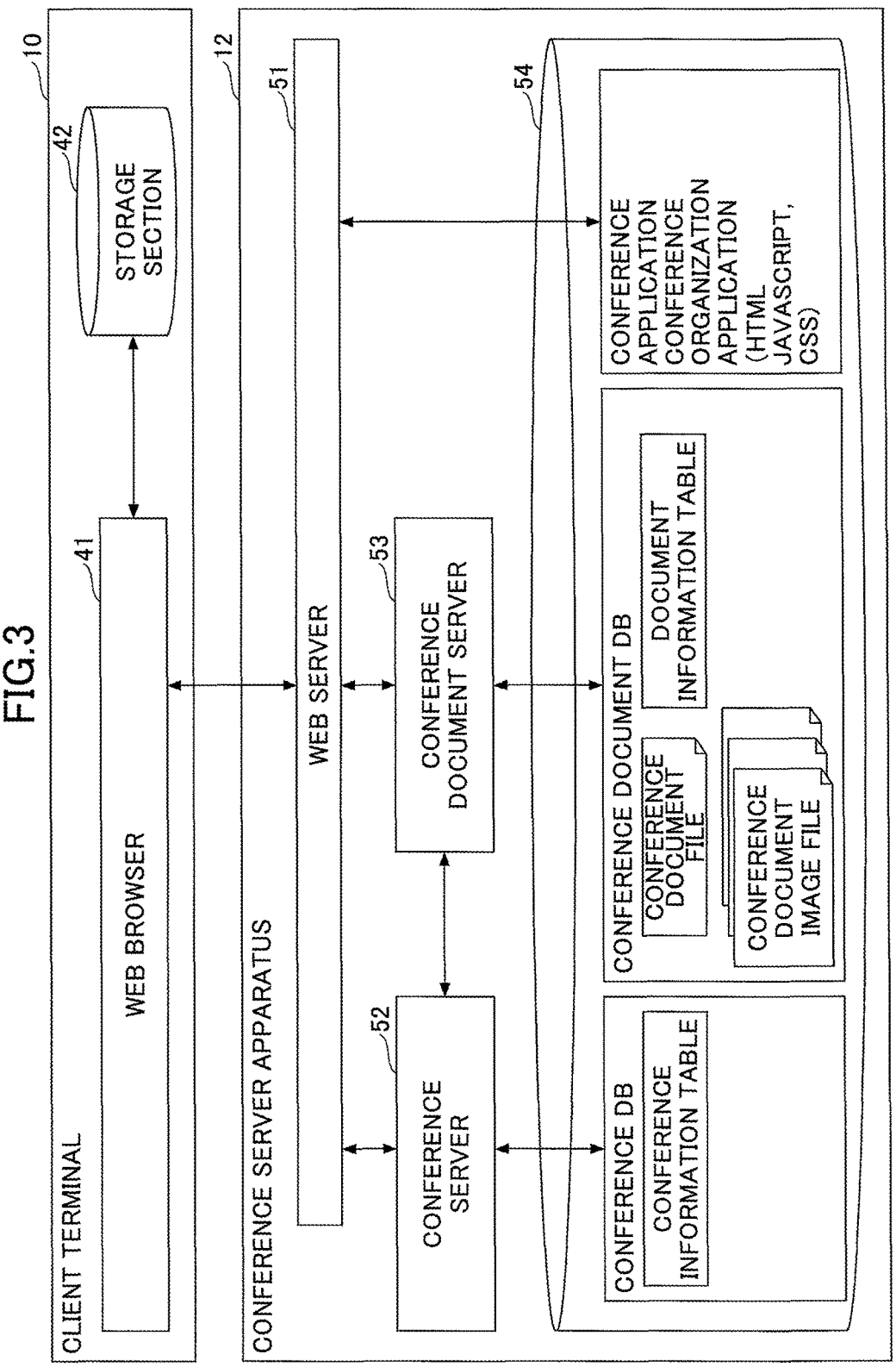
FIG. 3 is a functional block diagram of an example conference system according to an embodiment.

The conference system 1 according to this embodiment is realized by having, for example, functional blocks of FIG. 3. FIG. 3 is a functional block diagram of an example conference system according to this embodiment. With reference to FIG. 3, a conference system 1 is described where the conference server apparatus 12 communicates with the client terminal 10 using an instant messenger using, for example, an eXtensible Messaging and Presence Protocol (XMPP).

The XMPP is standardized by the Internet Engineering Task Force (IETF) as RFC3920 (Extensible Messaging Presence Protocol: Core), RFC3921 (Extensible Messaging and Presence Protocol: Instant Messaging and Presence), and, for example, the extensive specification is documented as XEP extensions (series).

In the XMPP, it is possible to provide services such as Group Chat (Multi-user Chat [XEP-0045]). Here, the "Group Chat" refers to a function in which when a client terminal(s) 10 participating in a Conference Room ("Room"), which is provided by the XMPP, sends a message to the conference server apparatus 12, the message is also sent to all the other client terminal(s) 10 which are participating in the Conference Room.

Further, in the XMPP, there are techniques including, for example, Bidirectional-Over Synchronous HyperText Transfer Protocol (HTTP) (BOSH) [XEP-0206] to transmit and receive a message over HTTP. By using BOSH, it becomes possible for the conference server apparatus 12 to not only realize the XMPP communications over HTTP but also realize a Push function. The "Push function" refers to a function where information is not transmitted as a response to a request from the client terminal 10 but the information is transmitted from the conference server apparatus 12 to the client terminal 10 and the client terminal 10 receives the information.

As illustrated in FIG. 3, the client terminal 10 includes a WEB browser 41, which is an example of an output control part, and a cache file storage section 42 which is an example of a storage part.

Based on the instructions or the like from a user, the WEB browser 41 acquires data such as, for example, the conference document, which corresponds to the conference in which the client terminal participates, from the conference server apparatus 12.

Further, the WEB browser 41 controls the timing to foresee the page ("second page") which is determined to be displayed subsequent to the page ("first page") displayed corresponding to the page information acquired from the conference server apparatus 12.

Here, the "page (which is) determined to be displayed next" refers to, for example, the sixth page when the fifth page is displayed in accordance with the page information. To that end, for example, the page may be included in the page information and it is possible to determine whether the next page exists by storing the numbers of pages of the conference documents in the conference information acquired from the conference server apparatus 12 and comparing the number of pages of the conference document to be displayed and the page number of the page data to be displayed. However, note that the method of determining whether a next page exists is not limited to this method.

The cache file storage section 42 stores, for example, the data of the page which is foreseen by the WEB browser 41. The cache file storage section 42 may be realized by, for example, the HDD 25, the RAM 23, the ROM 24 or the like.

As illustrated in FIG. 3, the conference server apparatus 12 includes a WEB server 51, which is an example of a request receive part, a conference server 52, which is an example of a management part, a conference document server 53, which is an example of a conversion part and an output control part, and an information storage section 54. Those elements are realized by executing a program. The information storage section 54 stores a conference database (DB), a conference document DB, a conference application, a conference organization application, etc. The conference DB stores a conference information table. The conference document DB store a conference document file, a document information table, and a conference document image file which is an image(s) converted from the conference document file.

The WEB server 51 has, for example, an information transmission and receiving function.

The conference server 52 reflects various requests for generating, editing, and deleting the conference from the client terminal 10 in the conference information table in the conference DB. The conference server 52 processes the various requests for, for example, organizing (holding), participating in, exiting, and terminating the conference from the client terminals 10. During a conference, the conference server 52 manages conference sharing information (e.g., displaying conference document, displaying pages of the conference document, handwritten memo data, etc.). Here, the requests from the client terminals 10 to the conference server apparatus 12 are sent by, for example, a message using the XMPP.

The conference document server 53 has, for example, a conference document management function and an image conversion function. Based on the requests from the client terminals 10 to register the conference document files, the conference document server 53 stores the conference document files in the conference document DB, and reflects the requests in the document information table. The conference document server 53 convers the conference document file stored in the conference document DB into conference document image files which are divided on a page basis (page data). Based on a request from the client terminals 10 to acquire the conference document image files, the conference document server 53 transmits the conference document image files to the client terminals 10.

Here, the conference document server 53 may serve as a file server using a File Transfer Protocol (FTP), World Wide Distributed Authoring and Versioning (WebDAV), etc., or may provide a download service based on a Uniform Resource Locator (URL) as a Web service. Further, the conference document server 53 may store the page data, which is the conference document files divided on a page basis, in the original data format (e.g., PDF), or may store the page data in an image format such as a Joint Photographic Experts Group (JPEG) format, a Portable Network Graphics (PNG) format, etc.

The information storage section 54 stores, for example, the conference application and the conference organization application which are to be executed on the WEB browser 41 included in the client terminal 10. Such a conference application and a conference organization application are realized by, for example, a HTML file (HTML document) and accompanying CSS file, JavaScript file, image file, etc., which are to be displayed on the WEB browser 41. The conference application and the conference organization application are downloaded from the conference server apparatus 12 to the client terminal(s) 10 and used.

In the conference system 1 of FIG. 3, by using, for example, an Asynchronous JavaScript XML (Ajax) technique, a Document Object Model (DOM) is operated, so that the content to be displayed on the WEB browser 41 is rewritten. Here, the "Ajax technique" refers to an implementation form in which a process is performed by transacting XML data using an HTTP communication function for a JavaScript file without reloading a Web page.

Note that the method of rewriting the content displayed on the WEB browser 41 is not limited to the method of updating the DOM. For example, in "HTML5", it is possible to directly rewrite the content displayed on the WEB browser 41.

Further, in the conference system 1, the WEB browser 41 of the client terminal 10 uses the WEB server 51 to communicate with the conference server 52. Here, it is not appropriate to use the XMPP message to transmit a large amount of binary data as a method of uploading the conference document file and downloading the conference document image file and the text file. In this regard, in the conference system 1, the uploading of the conference document file and the downloading of the conference document image file are performed by using, for example, an HTTP GET request and an HTTP POST request.

In the conference system 1, in accordance with the selection of the conference document file and the input (operation) of the display page and the like of the conference document file by a user, the XML data in JavaScript are generated and transmitted from the client terminal 10 to the conference server apparatus 12 as the Group Chat. Accordingly, the conference server apparatus 12 delivers the XML data to all the client terminals 10 participating in the Conference Room.

The conference organization application, which runs on the WEB browser 41 of the client terminal 10, interprets the XML data, and receives the conference document image file corresponding to the display page of the conference document file. Further, the conference organization application displays the conference document image file corresponding to the display page of the conference document file when, for example, the DOM is operated (updated). Further, the conference organization application updates the texts, figures, handwritten memo, etc., drawn on the displayed conference document image when, for example, the DOM is operated (updated).

Conference Information Table

FIG. 4 illustrates an example conference information table. As illustrated in FIG. 4, the conference information table stored in the conference DB includes, for example, a "conference ID", a "conference name", "start date and time", a "conference state", an "organization password", a "participation password", and a "document ID".

The "conference ID" refers to the information that uniquely identifies the conference set by the conference server 52 in accordance with a request for generating (organizing) the conference from the client terminal 10. The "conference name" can be arbitrarily set by a user and is used for a user to identify the conference. The "start date and time" can be arbitrarily set by a user and refers to, for example, the date and time when the conference is scheduled to start.

The "conference state" indicates, for example, one of "before started", "now taking place", and "finished". The "conference state" is an item set by the conference server 52 and is changed by the conference server 52 in accordance with the state. For example, when a conference is newly generated (organized), the "conference state" is set to "before started". When the conference is taking place, the "conference state" is changed to "now taking place". When all the users who participated in the conference exit and the conference is finished, the "conference state" is changed to "finished".

The "organization password" refers to the authentication information that is to be used when the conference is organized (generated). On the other hand, the "participation password" refers to the authentication information that is to be used to participate in the conference. When the "participation password" is set, any user who does not know the "participation password" cannot participate in the conference. The "document ID" refers to the information that is used to identify the conference document file and the conference document image file to be used in the conference.

Document Information Table

FIG. 5 illustrates an example document information table. As illustrated in FIG. 5, the document information table stored in the conference document DB includes, for example, the "document ID", a "document name", and a "storage location" as the items of the document information table. The "document ID" refers to the information that is used to identify the conference document file and the conference document image file to be used in the conference. The "document name" can be arbitrarily set by a user and is used for a user to identify the conference document file. The "storage location" indicates the storage location of the conference document file.

Details of the Processes

In the following, details of the processes of the conference system 1 according to this embodiment are described.

Conference Registration Process

FIG. 6 is a flowchart of an example conference registration process. As illustrated in FIG. 6, for example, before generating (organizing) a conference, a presenter or a host of the conference accesses a predetermined Uniform Resource Locator (URL) via the WEB browser 41 of the client terminal 10. By doing this, the WEB browser 41 of the client terminal 10 displays a conference registration screen of the conference application (S11). Here, FIG. 7 illustrates an example conference registration screen of the conference application.

In the conference registration screen of FIG. 7, the conference information and the conference data file which is to be displayed (browsed) in the conference are registered. As the conference information, for example, the conference name, the start date and time as the organized date and time, remarks, the participation password, an organization key as the organization password, a setting whether the conference name is displayed in the conference list, a setting whether the change of the presenter is prevented, etc., are registered.

From the content displayed on the conference registration screen described above, when, for example, a user presses the "store" button (see FIG. 7), the client terminal 10 registers the conference information and the conference document file (step S12). In the process of step S12, the conference application sends a request to the conference server apparatus 12 to register the conference information and the conference document file.

Next, the WEB server 51 of the conference server apparatus 12 divides the request to register the conference information and the conference document file into a request to register the conference information and a request to register the conference document file. Then, the conference server apparatus 12 sends the request to register the conference information to the conference server 52, and sends the request to register the conference document file to the conference document server 53. In response to the request to register the conference information, the conference server 52 stores the conference information into the conference information table illustrated in FIG. 4 (step S13). On the other hand, in response to the request to register the conference document file, the conference document server 53 stores the conference document file into the conference document DB (step S14). Further, in the process of step S14, the information of the conference document file is reflected in the document information table illustrated in FIG. 5. Further, it is preferable that the conference document server 53 divides the conference document file, which is stored in the conference document DB, into the conference document files on a page basis and stores the conference document files in the conference document DB as the converted image data.

Conference Organization Process

For example, when the presenter or the host of the conference selects "conference today" on the left-hand side of the conference registration screen of FIG. 7, a conference list screen as illustrated in FIG. 8 is displayed on the WEB browser 41 of the client terminal 10. FIG. 8 illustrates an example conference list screen.

The conference list screen in FIG. 8 displays the conference list stored in the conference information table in the conference server apparatus 12, so that a user can select to organize and participate in the conference. Here, the conference application running on the WEB browser 41 of the client terminal 10 acquires the conference information from the conference server apparatus 12 and displays the conference list screen.

When the conference to be organized is selected on the conference list screen of FIG. 8 by the presenter of the host of the conference, the conference organization application running on the WEB browser 41 of the client terminal 10 sends a request to the conference server apparatus 12 to organize the conference. The conference server 52 of the conference server apparatus 12 that receives the request to organize the conference generates the Conference Room ("Room") in, for example, the XMPP.

In this case, when the organization password is set in the conference information to the conference to be organized, the conference organization application prompts the presenter or the host of the conference to input the organization password and adds the input organization password to the request to organize the conference.

Further, when the "conference today" of the conference registration screen of FIG. 7 is selected by the presenter or the host of the conference, the conference application displays the conference list screen of FIG. 8 on the WEB browser 41 of the client terminal 10. Then, the conference to be participated in is selected on the conference list screen of FIG. 8 by the presenter or the host of the conference, the conference organization application sends a request to the conference server apparatus 12 to participate in the conference.

The conference server 52 of the conference server apparatus 12 that receives the request to participate in the conference causes the client terminal 10 to participate in the conference by entering the client terminal 10 into the Conference Room which is provided by, for example, the XMPP. In this case, when the participation password is set in the conference information to the conference to participate in, the conference organization application prompts the presenter or the host of the conference to input the participation password and adds the input participation password to the request to participate in the conference.

Page Display Synchronization Process

Figure 9:
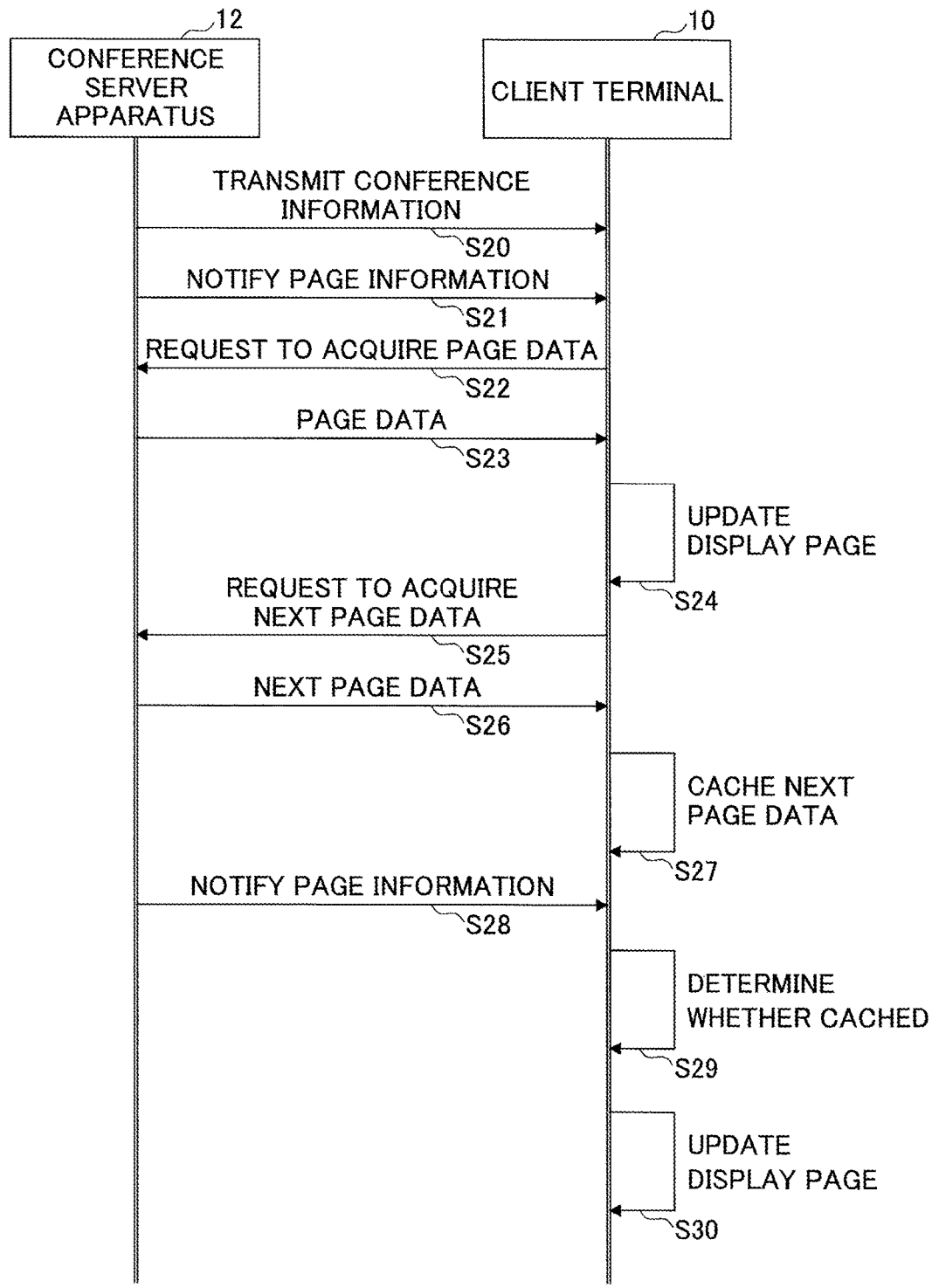
FIG. 9 is a sequence diagram of an example of a page display synchronization process.

FIG. 9 is a sequence diagram of an example page display synchronization process. The page display synchronization process of FIG. 9 is executed by the client terminal 10 and the conference server apparatus 12. In the example of FIG. 9, a process is described which is performed after the conference organization application of the client terminal 10 sends a request to the conference server apparatus 12 to generate (organize) a conference and the conference server apparatus 12 notifies the client terminal 10 of the success of the participation in the Conference Room.

As described in FIG. 9, after notifying the client terminal 10 of the success of the participation in the Conference Room, the conference server apparatus 12 transmits the conference information to the client terminal 10 (step S20). The conference information transmitted from the conference server apparatus 12 includes, for example, the number of the participants, the members, and the information of the conference document file (the document ID, the document name, the storage location of the document (e.g., address, acquired UDR), etc.).

Next, the conference server apparatus 12 notifies the client terminal 10 of the page information (step S21). The page information refers to the information identifying the page which is displayed in the current conference and including, for example, the document ID and the page number of the conference document file. For example, the page information indicates the information of the page which is displayed on the conference screen of the client terminal 10 of the presenter. The page information further includes page update information which indicates page switching when a page is turned or jumped based on an operation on the conference screen.

The WEB browser 41 of the client terminal 10 sends a request to the conference server apparatus 12 to acquire the page data (first data) of the conference document image file corresponding to the page information acquired from the conference server apparatus 12 (step S22).

The conference server apparatus 12 transfers the request, which is from the WEB browser 41 of the client terminal 10 to acquire the page data, to the conference document server 53, so that the conference document server 53 transmits the corresponding page data to the client terminal 10 (step S23).

The conference organization application running on the WEB browser 41 of the client terminal 10 updates the page data downloaded from the conference document server 53 and displays the page, for example, on the conference screen of the WEB browser 41 (step S24). By doing this, it becomes possible that the page displayed on all the client terminals 10 participating in the conference is synchronized with the page that is displayed in the current conference.

Next, based on the page information acquired in step S21, the WEB browser 41 of the client terminal 10 determines (foresees) the page to be displayed next. Further, the WEB browser 41 of the client terminal 10 controls the timing to foresee the page data of the conference document file that is determined (foreseen) to be displayed next (next page data (second data)), and sends a request to the conference server apparatus 12 to acquire the next page data (step S25).

In step S25, it is determined whether the page displayed in step S24 corresponds to the data that is firstly acquired by the conference server apparatus 12 when the client terminal 10 organizes or participates in the conference or the data cached in the cache file storage section 42.

Based on the determination result, the workloads of the network N1 and the conference server apparatus 12 when the page data are downloaded from the conference server apparatus 12 are considered, so that the timing to foresee the next page data is controlled. Here, the next page data to be foreseen may include plural pages.

After the conference server apparatus 12 transfers the request to acquire the next page data to the conference document server 53, the conference document server 53 transmits the corresponding next page data to the client terminal 10 (step S26). The WEB browser 41 of the client terminal 10 caches the next page data downloaded from the conference document server 53 into the cache file storage section 42 (step S27).

Next, a case is described where the page switching is performed (i.e., when a page is turned or jumped) on the page displayed on the conference screen. For example, when the conference organization application running on the WEB browser 41 of the client terminal 10 of the presenter of the conference detects the displayed page of the conference document file to be displayed next by the page switching (i.e., when a page is turned or jumped), the conference organization application notifies the conference server apparatus 12 of the detection.

The conference server apparatus 12 notifies all the client terminals 10 participating in the conference of the page information of the page to be displayed next (step S28). Based on the page information acquired from the conference server apparatus 12, the WEB browser 41 of the client terminal 10 determines whether the page data of the corresponding conference document image file is cached in the cache file storage section 42 (step S29).

When the WEB browser 41 of the client terminal 10 determines that the page data are cached, the conference organization application acquires the page data from the cache file storage section 42 and updates the page to be displayed (step S30).

On the other hand, when WEB browser 41 of the client terminal 10 determines that the page data are not cached, the WEB browser 41 sends a request to the conference server apparatus 12 to acquire the corresponding file.

As described above, after displaying the page corresponding to the page information acquired from the conference server apparatus 12, the client terminal 10 foresees the page to be displayed next and controls the timing of a foreseeing process. By doing this, it becomes possible to improve the output performance of data.

Example Conference Screen

Figure 10:
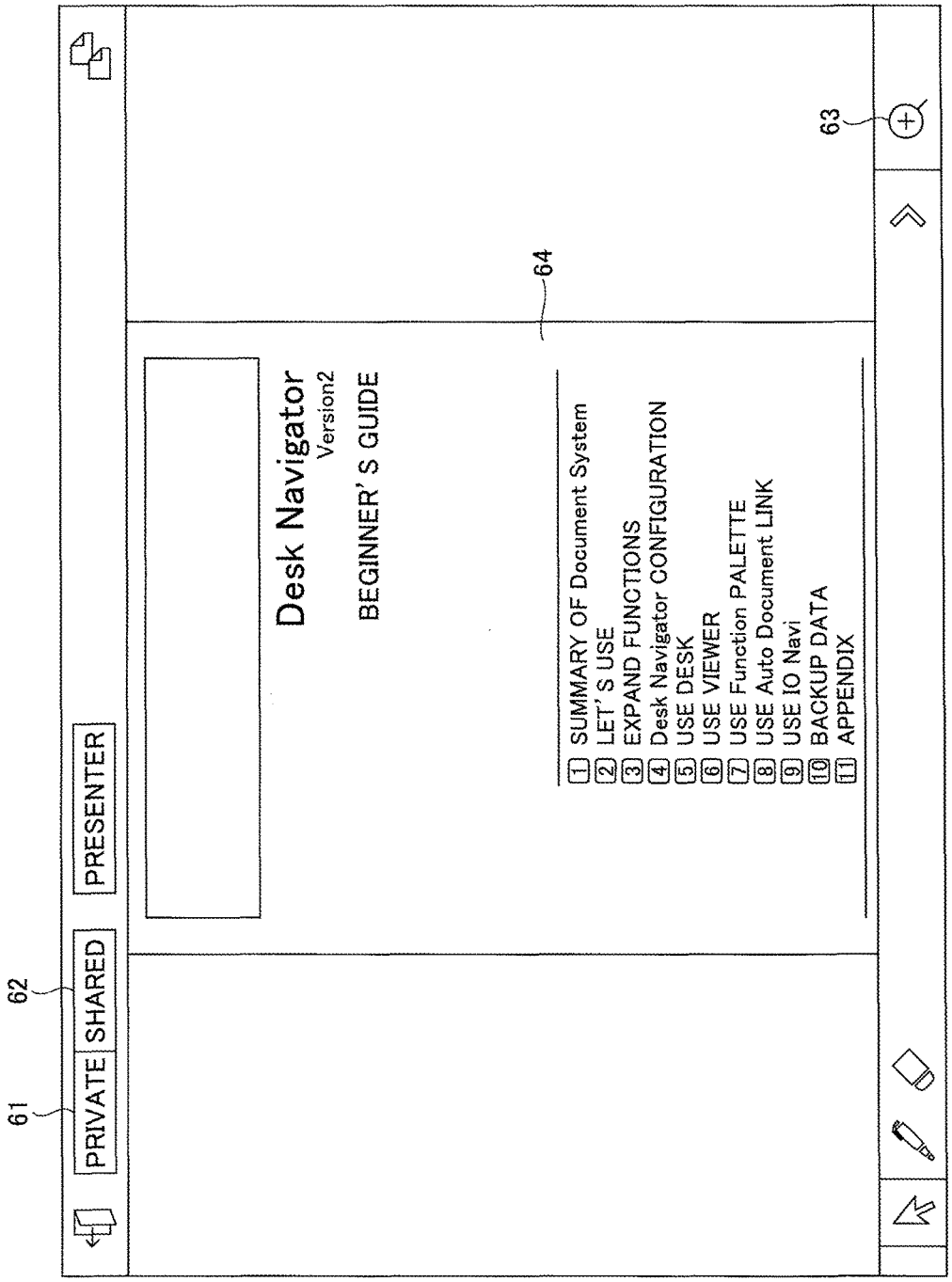
FIG. 10 a conceptual drawing of an example conference screen.

The conference organization application running on the WEB browser 41 of the client terminal 10 displays the downloaded conference document image file on a conference screen as illustrated in FIG. 10. FIG. 10 illustrates an example conference screen.

The conference screen of FIG. 10 includes (displays), for example, an image 64 of the conference document image file downloaded from the conference server apparatus 12. The "private" button 61 of FIG. 10 is used when the user wishes to select (designate) a "private mode" in which the user can freely turn pages without the displayed page being in synchronization with the page that is designated (used) by the presenter of the conference. On the other hand, the "shared" button 62 of FIG. 10 is used when the user wishes to select a "shared mode" in which the image 64 is updated in synchronization with the page that is designated (used) by the presenter of the conference. The button 63 in FIG. 10 is used to enlarge or reduce the image 64.

By using the conference screen of FIG. 10, the presenter, the participants, etc., can browse the image 64 of the conference document image file.

Foreseeing Process

Figure 11:
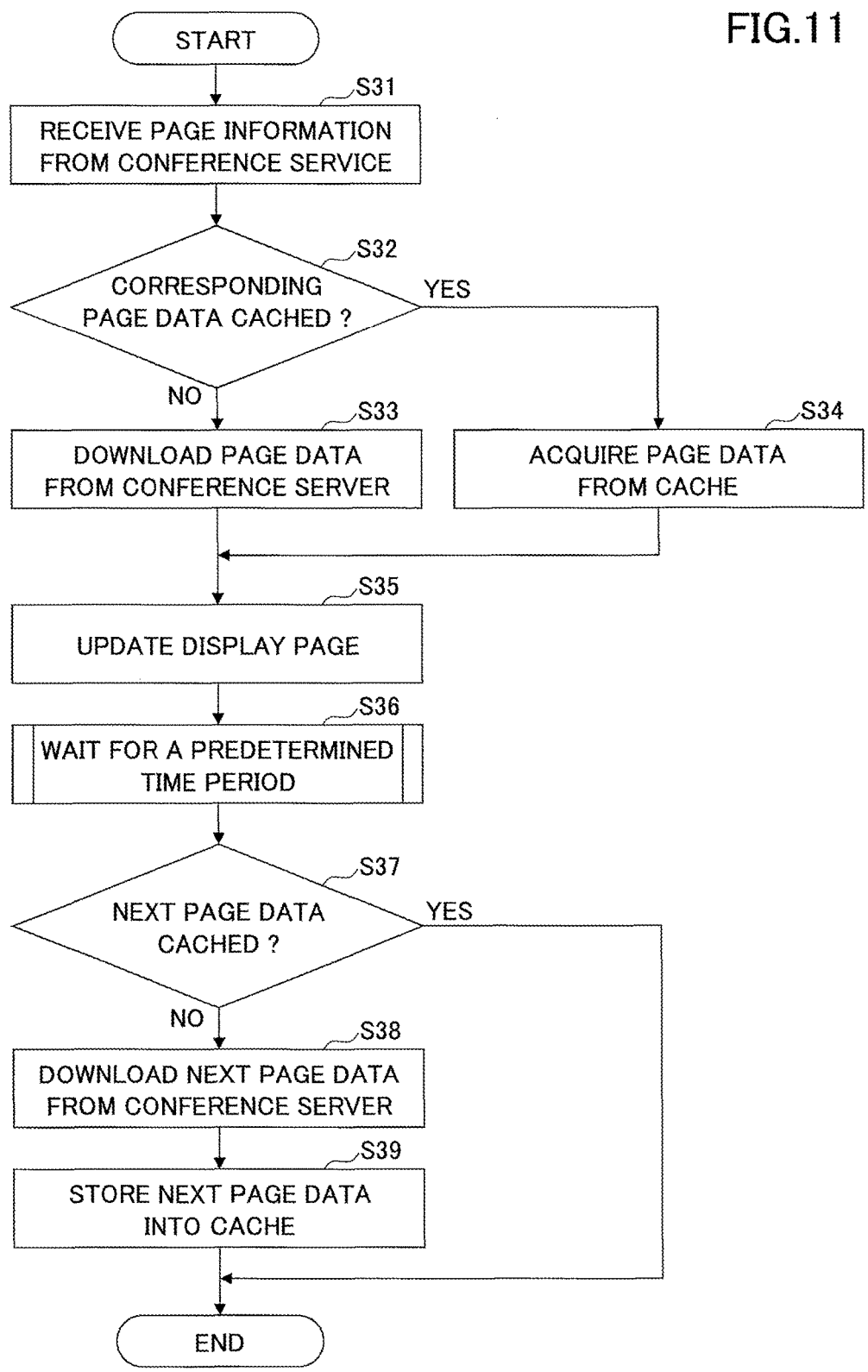
FIG. 11 is a flowchart of an example foreseeing process of a client terminal.

In the page display synchronization process of FIG. 9, when acquiring the page information from the conference server apparatus 12, the client terminal 10 determines whether the corresponding page data are already cached in the cache file storage section 42. FIG. 11 is a flowchart of an example foreseeing process.

As illustrated in FIG. 11, when the client terminal 10 acquires the page information from the conference server apparatus 12 (step S31), the client terminal 10 determines whether the corresponding page data are already cached in the cache file storage section 42 based on the page information (step S32).

When determining that the corresponding page data are not cached (NO in step S32), the WEB browser 41 of the client terminal 10 downloads the corresponding page data from the conference server apparatus 12 (step S33). When determining that the corresponding page data are cached (YES in step S32), the WEB browser 41 of the client terminal 10 acquires the corresponding page data from the cache file storage section 42 (step S34).

The conference organization application running on the WEB browser 41 of the client terminal 10 updates the page data to be displayed (step S35). After that, in order to control the timing for the foreseeing process, the client terminal 10 waits for a predetermined time period by using a timer event (step S36). A specific example of the process in step S36 is described below.

After step S36, based on the page information received in step S36, the WEB browser 41 of the client terminal 10 determines the page to be displayed next and further determines whether the corresponding next page data are cached in the cache file storage section 42 (step S37).

When it is determined that the corresponding page data are not cached (NO in step S37), the client terminal 10 downloads the corresponding next page data from the conference server apparatus 12 (step S38), and stores the next page data in the cache file storage section 42 (step S39). On the other hand, when it is determined that the corresponding page data are cached (YES in step S37), the process ends.

For example, in the process of step S32, it is determined whether the corresponding page data file is cached in the cache file storage section 42 based on, for example, the document ID and page number acquired in the page information. However, the present invention is not limited to this example.

For example, in a Web application, a configuration of the cache can be applied to the WEB browser 41. In response to the GET request to get data from the WEB browser 41, the WEB server 51 adds the latest update date and time as "Last-Modified" to the header of the HTTP response and transmits the HTTP response to the WEB browser 41. In response to the received data from the WEB server 51, the WEB browser 41 records the latest update date and time.

Next, when sending a request to the WEB server 51 to acquire data, the WEB browser 41 adds the recorded latest update date and time as "If-Modified-Since" to the header of the request and sends the request to the WEB server 51. When the WEB server 51 determines that the data to be sent as the response are the same as the data cached in the WEB browser 41 (i.e., the data already transmitted), the WEB server 51 transmits "status 304 information" (Not Modified) in place of transmitting the same data again.

Based on the "status 304 information", the WEB browser 41 uses the cached data. On the other hand, when determining that the data to be sent as the response are not the same as the data cached in the WEB browser 41, the WEB server 51 transmits the data along with "status 200 information". By doing this, by using the cache function of the WEB browser 41, whether the corresponding data are cached may be determined.

Predetermined Time Wait Process

Figure 12:
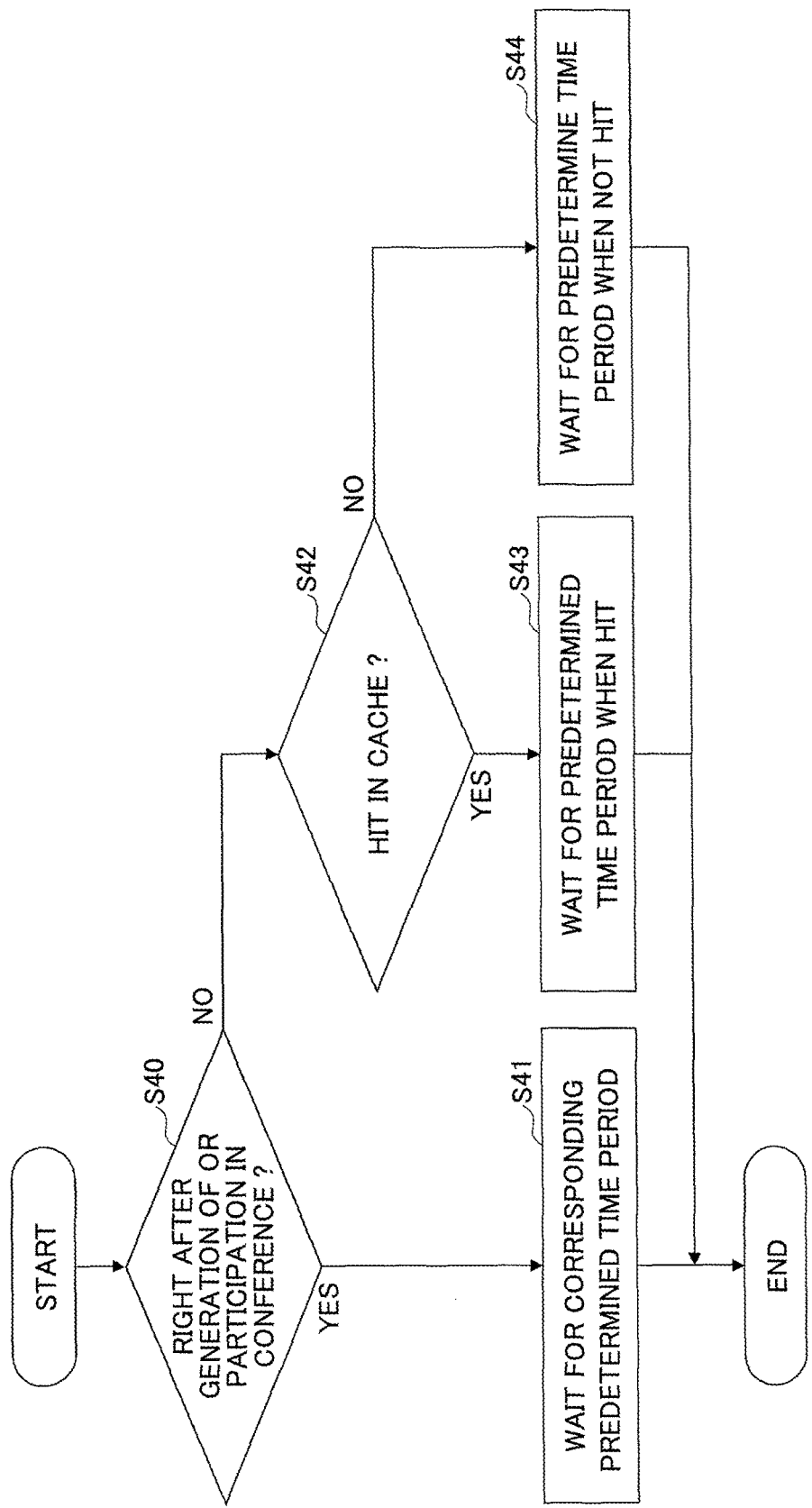
FIG. 12 is a flowchart of an example of a predetermined time wait process.

The predetermined time wait process in step S36 in FIG. 11 is described. FIG. 12 is a flowchart of an example predetermined time wait process. In the example of FIG. 11, the time interval of the foreseeing process is adjusted, so that the network workload due to the foreseeing process does not influence, for example, the download (distribution) by the other client terminals 10.

To that end, as illustrated in FIG. 12, after the update the page to be displayed (display page), the WEB browser 41 of the client terminal 10 determines whether it is right after the conference is organized (started) or right after the client terminal 10 participates in the conference (step S40). In step S40, by determining whether it is right after the conference is organized (started) or right after the client terminal 10 participates in the conference, the WEB browser 41 of the client terminal 10 determines whether the updated display page corresponds to the page data firstly acquired from the conference server apparatus 12.

When determining that it is right after the conference is organized (started) or right after the client terminal 10 participates in the conference (YES in step S40), the WEB browser 41 of the client terminal 10 waits for a time period that is previously determined for the case when it is right after the conference is organized (started) or right after the client terminal 10 participates in the conference (step S41).

Namely, in the case when the it is right after the conference is organized (started) or right after the client terminal 10 participates in the conference, it is thought that the communications are performed for not only acquiring display data but also, for example, transmitting other data necessary for the conference. Further, in a case of a Web application, in order to display and execute the Web application, it may become necessary to download relevant HTML files, CSS files, JavaScript files, and image files in JPEG, PNG, etc., format. Therefore, when the foreseeing process is performed right after the conference is organized (started) or right after the client terminal 10 participates in the conference, it is preferable to wait for a time period longer which is than the time period set for the case when (after) the page is turned.

On the other hand, when determining that it is neither right after the conference is organized (started) nor right after the client terminal 10 participates in the conference (NO in step S40), the WEB browser 41 of the client terminal 10 further determines whether the updated display page (first data) corresponds to the data hit in the cache (step S42). In step S42, it is determined whether the page that is currently displayed corresponds to the data stored in the cache file storage section 42.

When determining that the updated display page (first data) corresponds to the data hit in the cache (YES in step S42), the WEB browser 41 of the client terminal 10 waits for a time period that is previously determined for the case when the data hit in the cache (step S43). On the other hand, when determining that the updated display page (first data) does not correspond to the data hit in the cache (NO in step S42), the WEB browser 41 of the client terminal 10 waits for a time period that is previously determined for the case when the data doesn't hit in the cache (step S44). Then, the process ends.

In step S42, in the case where the updated display page corresponds to the data hit in the cache, it is thought that, for example, the updated display page corresponds to the data hit in the cache in the other client terminal(s) 10 that are participating in the conference as well. Namely, in this case, it is thought that the download of the display page from the conference server apparatus 12 by the other terminal(s) 10 does not occur. Therefore, even if the foreseeing process is started immediately, it is thought that the foreseeing process does not influence the download by the other client terminal(s) 10. Further, it is preferable that the foreseeing process is performed before the next page switching (i.e., a page is turned or jumped) occurs.

In this regard, it is preferable to determine the time period of the wait time so as to wait for the determined time period.

Table to Determine Wait Time

FIG. 13 illustrates an example table to determine the wait time. As described above, right after the conference is organized (started) or right after the client terminal 10 participates in the conference, it is thought that output data are acquired and other data necessary for the conference are transmitted (communicated). Therefore, in the example of FIG. 13, the time interval of the foreseeing process (e.g., the wait time from the update of the display page to perform the foreseeing process) is determined (set) as "30 seconds".

When it is not right after the conference is organized (started) or when it is not right after the client terminal 10 participates in the conference, a wait time shorter than the above wait time is determined. For example, when is not right after the conference is organized (started) or when it is not right after the client terminal 10 participates in the conference, if the updated display data hit in the cache, for example, the network load is not increased due to the download of the display page by the other client terminal(s) 10. Therefore, the time interval of the foreseeing process is determined (set) as "0 seconds".

Further, when the updated display page doesn't hit in the cache, it is thought that the other client terminal(s) 10 as well is required to acquire the update display page. In this regard, in order not to prevent the acquisition(s) of the update display page by the other client terminal(s) 10, the interval of the foreseeing process is determined (set) as "10 seconds".

In this embodiment, the interval of the foreseeing process is not limited to the values of seconds described above. The value may be changed based on, for example, a use state such as the workload of the network N1, the workload of the conference server apparatus 12, the number of the client terminals 10 connected to the network N1, etc. Further, for example, the conditions to set the time interval of the foreseeing process are not limited to the conditions described in FIGS. 12 and 13. The time interval of the foreseeing process may be set based on any other condition.

Further, the time interval of the foreseeing process may be set as a fixed time or a random value within a certain range as a reference may be determined as the time interval of the foreseeing process. By performing the foreseeing process, it becomes possible to reduce the workloads of the network and the server. Further, for example, the conference server apparatus 12 determines the start timing of the foreseeing process based on the synchronization message of the page switching or the acquisition request to acquire data, and transmits the determined start timing of the foreseeing process to the client terminal 10.

As described above, in this embodiment, for example, the conference document data are stored in the form of the divided data on a page basis, so that the divided data can be distributed sequentially (downloaded) to the client terminal on a necessary basis. By doing this, it becomes possible to, for example, reduce the time to take for a single data distribution so as to reduce the time to complete the download of the conference document in a time period shorter than which is necessary when the conference document is downloaded collectively.

Further, in the case where the data are sequentially distributed whenever the page switching is performed, when plural client terminals 10 synchronously update the displays of the page, network loads between the conference server apparatus 12 and the plural client terminals 10 are generated concurrently. In this case, it is expected that a time period takes longer for the data distribution and display of the new page. To resolve this problem, as described above, the timing to read data is controlled so as to cache the foreseen data. Further, such caching is separately performed by the plural client terminals 10.

As described, the data are not read when the data are required by, for example, the page switching, but the data are read in advance to be stored in the cache and used. By doing this, it becomes possible to cut the download time when the display data actually become necessary. Further, in order to prevent the network load caused by the foreseeing process from influencing normal data distribution, the foreseeing process is performed after an appropriate time period has passed since the display data are distributed. By doing this, it becomes possible to display the new page more quickly.

As described above, according to this embodiment, it becomes possible to effectively improve the data output performance. In the above embodiment, a case is described where the conference document is distributed. However, the present invention is not limited to this example. For example, the present invention may also be applied to a case where, for example, documents are distributed to students, participants, etc., in the classes, seminars, meetings, events, etc., in educational fields, service enterprises, etc.

According to an embodiment, it becomes possible to improve the output data performance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a CPU, a RAM, and an HDD. The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing system comprising:
one or more terminal devices; and
an information processing apparatus connected to the one or more terminal devices via a network;
wherein the one or more terminal devices each include,
a memory having computer readable instructions stored thereon, and
at least one processor configured to execute the computer readable instructions to,
acquire first data from the information processing apparatus,
control timing to acquire second data from the information processing apparatus, the second data being data to be output subsequent to the first data, the first data and the second data being converted from document data, the document data having a plurality of pages, into a plurality of image data on a per page basis, each of the plurality of image data including page information,
store the acquired second data in the memory,
receive current page information from the information processing apparatus, the current page information including information identifying a document ID and a current page associated with a document which is currently displayed by a conference presenter terminal device of the one or more terminal devices,
determine next page information based on the current page information, the next page information including the timing information for acquiring the second data, and
display at least one of the first data and the second data based on the received current page information.

2. The information processing system according to claim 1, wherein the at least one processor is further configured to control the timing information for acquiring the second data based on a workload of the network, a workload of the information processing apparatus, or a number of the terminal devices.

3. The information processing system according to claim 1, wherein the at least one processor is further configured to control the timing information for acquiring the second data based on whether the first data are firstly acquired from the information processing apparatus.

4. The information processing system according to claim 1, wherein the at least one processor is further configured to control the timing information for acquiring the second data based on whether the first data are stored in the memory.

5. The information processing system according to claim 1, wherein the at least one processor is further configured to control the timing information for acquiring the second data after a desired time period has passed since an output timing of the first data, the desired time period having been set in advance or having been randomly determined within a desired range.

6. The information processing system according to claim 5, wherein the desired time period is set by the information processing apparatus and transmitted to the one or more terminal devices.

7. The information processing system according to claim 1, wherein the at least one processor is further configured to: display the first data and the second data in a synchronized manner with other terminal devices connected to a same conference.

8. The information processing system according to claim 1, wherein the received current page information is related to page update information transmitted from the conference presenter terminal device.

9. The information processing system according to claim 1, wherein
the received current page information is information to be reported by another terminal device based on a presenter's operation related to a conference; and
the information processing apparatus is configured to transmit the current page information to all terminal devices connected to the conference.

10. The information processing system according to claim 1, wherein the at least one processor is further configured to:
display the first data based on the received current page information.

11. The information processing system according to claim 1, wherein the next page information is determined after the first data has been displayed.

12. The information processing system according to claim 11, wherein the at least one processor is further configured to:
transmit a request to acquire the first data corresponding to the current page information to the information processing apparatus;
receive the first data in response to the transmitted request;
receive the second data associated with the next page information; and
store the received second data in the memory.

13. A terminal device comprising:
a memory having computer readable instructions stored thereon; and
at least one processor configured to execute the computer readable instructions to,
acquire first data from an information processing apparatus connected to the terminal device via a network,
control timing to acquire second data from the information processing apparatus, the second data being data to be output subsequent to the first data, the first data and the second data being converted from document data, the document data having a plurality of pages, into a plurality of image data on a per page basis, each of the plurality of image data including page information;
store the acquired second data in the memory,
receive current page information from the information processing apparatus, the current page information including information identifying a document ID and a current page associated with a document which is currently displayed by a terminal device of a conference presenter,
determine next page information based on the current page information, the next page information including the timing information for acquiring the second data, and
display at least one of the first data and the second data based on the received current page information.

14. A method to be executed by a terminal apparatus, comprising:
acquiring, using at least one processor, first data from an information processing apparatus connected to the terminal apparatus via a network;
controlling, using the at least one processor, timing to acquire second data from the information processing apparatus, the second data being data to be output subsequent to the first data, the first data and the second data being converted from document data, the document data having a plurality of pages, into a plurality of image data on a per page basis, each of the plurality of image data including page information;
storing, using the at least one processor, the acquired second data in a memory;
receiving, using the at least one processor, current page information from the information processing apparatus, the current page information including information identifying a document ID and a current page associated with a document which is currently displayed by a terminal apparatus of a conference presenter;
determining, using the at least one processor, next page information based on the current page information, the next page information including timing information for acquiring the second data; and
displaying, using the at least one processor, at least one of the first data and the second data based on the received current page information.

15. The method according to claim 14, wherein the controlling includes controlling the timing information for acquiring the second data based on a workload of the network, a workload of the information processing apparatus, or a number of the terminal apparatuses connected to the conference.

16. The method according to claim 14, wherein the controlling includes controlling the timing information for acquiring the second data based on whether the first data are firstly acquired from the information processing apparatus.

17. The method according to claim 14, wherein the controlling includes controlling the timing information for acquiring the second data based on whether the first data is stored in the memory.

18. The method according to claim 14, wherein the controlling includes controlling the timing information so as to acquire the second data after a desired time period has passed since an output timing of the first data, the desired time period having been set in advance or having been randomly determined within a desired range.

19. The method according to claim 18, wherein the desired time period is set by the information processing apparatus and transmitted to the terminal apparatus.

* * * * *